United States Patent

Hua et al.

[11] Patent Number: 5,999,433
[45] Date of Patent: Dec. 7, 1999

[54] HALF-BRIDGE DC TO DC CONVERTER WITH LOW OUTPUT CURRENT RIPPLE

[75] Inventors: Guichao Hua; Xinfu Zhuang, both of Blacksburg; Daniel M. Sable, Pearisburg, all of Va.

[73] Assignee: VPT, Inc., Blacksburg, Va.

[21] Appl. No.: 09/005,669

[22] Filed: Jan. 12, 1998

[51] Int. Cl.$^6$ ...................... H02M 7/5387; H02M 3/335
[52] U.S. Cl. ................ 363/132; 363/17; 363/47
[58] Field of Search ................ 363/16, 17, 39, 363/45, 46, 47, 97, 98, 131, 132

[56] References Cited

U.S. PATENT DOCUMENTS

| | | | |
|---|---|---|---|
| 4,387,418 | 6/1983 | Koike | 363/97 |
| 4,860,184 | 8/1989 | Tabisz et al. | |
| 5,245,520 | 9/1993 | Imbertson | |
| 5,325,283 | 6/1994 | Farrington et al. | |

OTHER PUBLICATIONS

Static And Dynamic Analysis of Zero–Voltage–Switched Half–Bridge Converter with PWM Control Tamotsu Ninomiya, Norio Matsumoto, Masatoshi Nakahara, Koosuke Harada 4/91/0700–0230 1991 IEEE, pp. 230–237.

*Primary Examiner*—Shawn Riley
*Assistant Examiner*—Y. J. Han
*Attorney, Agent, or Firm*—James H. Beusse; Holland & Knight LLP

[57] ABSTRACT

A method and apparatus for maintaining relatively low ripple current in a dc-dc converter while minimizing the size of an inductive line filter utilizes a transformer having at least a pair of secondary windings in which the secondary windings are selected to have different numbers of winding turns depending on the specific design of the ideal duty factor at which the converter will be operated. In addition, the converter is provided with an active pre-load which establishes a continuous conduction current when load current is below some selected minimum value in order to provide control stability during light load conditions without converter oscillations. In an illustrated embodiment, the active pre-load circuit comprises a resistor connected in series with a transistor across the voltage output of the converter with the gate terminal of the transistor connected through a zener diode to the control circuit so that when the control voltage feedback signal drops to a selected low value, the transistor is biased into conduction to connect the resistor as a load to maintain a minimum load current. Alternatively, the transistor can be connected across one of the diodes in the transformer secondary and arranged so as to conduct current in a direction opposite to the direction of current through the diode so that under low current conditions, a current loop is formed through the transformer to maintain continuous current flow and allow the converter to operate at very light loads.

17 Claims, 9 Drawing Sheets

HALF-BRIDGE DC TO DC CONVERTER WITH LOW OUTPUT CURRENT RIPPLE

BACKGROUND OF THE INVENTION

This invention relates to dc-dc power converters and, more particularly, to half-bridge, pulse-width modulated dc-to-dc converters.

Figure 1:
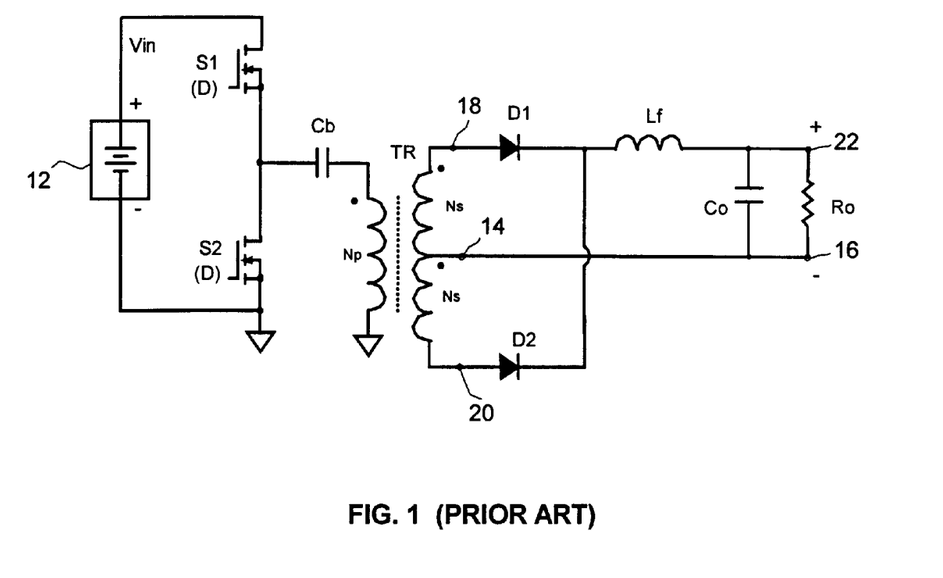
FIG. 1 illustrates an exemplary form of half-bridge, pulse-width modulated, dc-dc converter.

The conventional half-bridge (HB) pulse-width modulated (PWM) converter is well known and is frequently used for low-to-medium dc-dc power conversion applications. An exemplary form of such converter is shown in FIG. 1 at 10. Normally, the two power switches S1 and S2 in the HB PWM converter are switched alternately with symmetrical duty cycle control and operate with hard switching. The electronic power switches S1 and S2 may be MOSFET or other well known types of electronically controllable, high speed switches and are serially connected across a source 12 of dc power (battery or rectifier coupled to ac source). A junction intermediate the switches S1, S2 is connected to one terminal of primary winding $N_p$ of a power transformer TR through a series capacitor Cb. Transformer TR has a pair of substantially identical windings NS, and $NS_2$ having a common terminal at 14 connected to a relatively negative dc output terminal 16. Opposite winding end terminals 18 and 20 are connected through respective diode rectifiers D1 and D2 to one end of an output filter inductor Lf. Another end of inductor Lf connects to a relatively positive output terminal 22. A resistive load $R_0$ and output filter capacitor $C_0$ connect in parallel to the dc output terminals. The converter 10 operates by gating switch S1 into conduction for a controlled time interval, gating switch S1 out of conduction and then gating switch S2 into conduction. Power is transferred into the converter while S1 conducts. During S2 conduction, the reactive components allow resonant action to occur so that current continues to the load. Due to the high switching loss and high switching noise problems associated with hard-switching operation of the devices S1, S2, the conventional HB PWM converter is not suited for high-frequency operation. In order to reduce the switching loss and noise of the converter, several zero voltage switching (ZVS) techniques have been developed.

Tabisz, Lee, and Jovanovic in U.S. Pat. No. 4,860,184 "Half-Bridge Zero-Voltage Switched Multi-Resonant Converter," disclose a HB converter which can achieve ZVS for both the primary switches (S1, S2) and the secondary rectifying diodes (D1, D2), but it requires the use of a large resonant inductor which results in very high circulating energy and low efficiency. Also, the converter relies on wide-range frequency modulation to regulate the output voltage.

Farrington, Jovanovic, and Lee in U.S. Pat. No. 5,325,283 "Novel Zero-Voltage-Switching Family of Isolated Converters," show a HB converter using symmetrical duty cycle and variable frequency control to achieve ZVS and regulate output voltage. The need for wide-range switching frequency modulation significantly penalizes the performance of the converter by increasing the size of the reactive components (capacitors, transformers, and inductors). In addition, the converter requires a large output filter inductor and also a third rectifying diode.

Ninomiya, Matsumoto, Nakahara and Harada ("Ninomiya") in their 1991 IEEE PESC Record article "Static and Dynamic Analysis of ZVS Half-Bridge Converter with PWM Control" disclose a HB converter using magnetizing energy and asymmetrical duty cycle to achieve ZVS. Its major limitation is in requiring the use of a large output filter inductor when it operates at low duty cycles. This significantly increases the size of the converter and also results in a decrease in conversion efficiency. In addition, this converter exhibits an inherent control stability problem at light load which necessitates the use of a large pre-load for very light load or no load operation.

Imbertson in U.S. Pat. No. 5,245,520 "Asymmetrical Duty Cycle Power Converter" discloses a HB converter which uses asymmetrical duty cycle control and a commutating inductor in series with the power transformer to achieve ZVS. Similar to the Ninomiya converter, Imbertson also requires the use of a large output filter inductor when operating at low duty cycles and exhibits an inherent control stability problem at light load. With the help of a series commutating inductor, the switch conduction loss is somewhat reduced, but ZVS can be easily lost as load current decreases.

Figure 2:
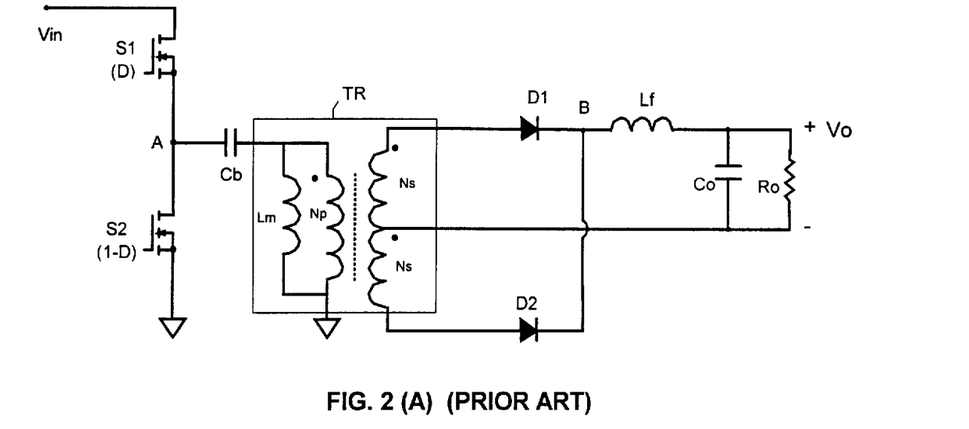
FIG. 2A is a simplified schematic of another form of zero voltage switching, half-bridge, pulse-width modulated, dc-dc converter.
FIG. 2B illustrates the switching waveforms occurring in the converter of FIG. 2A.
Figure 3:
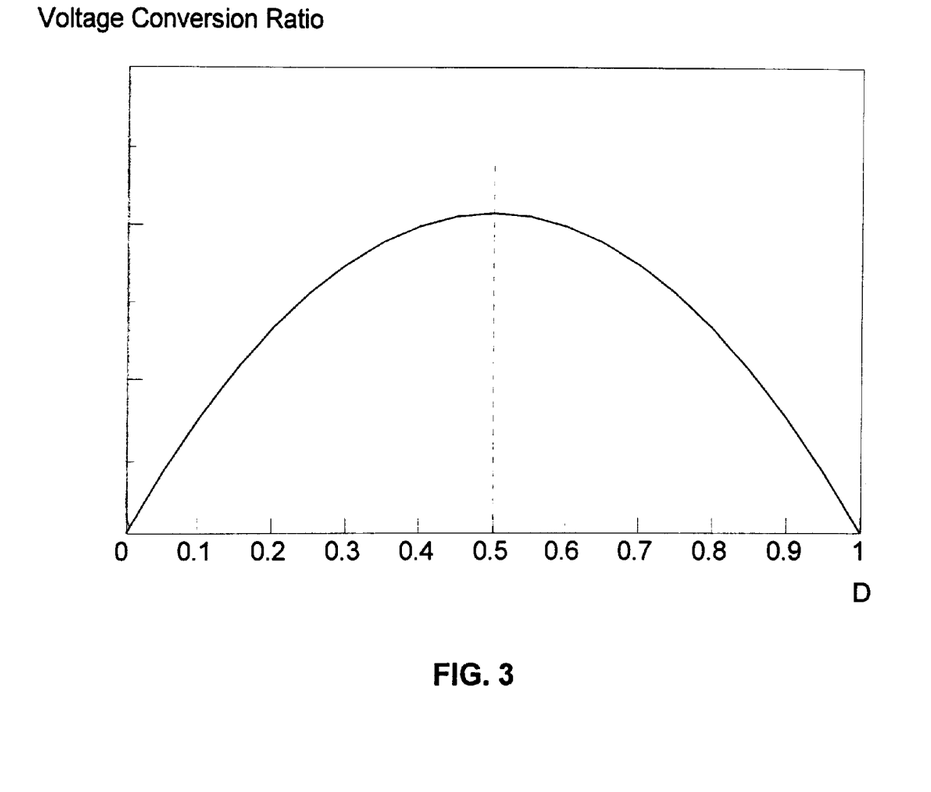
FIG. 3 is a graph illustrating the voltage conversion characteristics of the converter of FIG. 2A.

FIGS. 2A and 2B show the circuit schematic and switching waveforms respectively of the ZVS HB converter disclosed in the Ninomiya article. Two primary switches S1 and S2 are turned on and off complementary with certain dead times (t0–t1 and t2–t3) in between to allow ZVS to occur. The power transformer TR has one primary winding $N_P$ and two identical secondary windings NS1 and NS2. The transformer is designed to have a fairly low magnetizing inductance so that the peak magnetizing current at either switch S1 or S2 turn-off is greater than the reflected output filter inductor Lf current. In this way, ZVS operation can be maintained even at light load. During the S1 OFF period (t1–t2) and ON period (t3–t0'), the voltage, $V_B$, appearing in front of the output filter inductor $L_f$ is equal to $DV_{in}/(Np/Ns)$ and $(1-D)V_{in}/(Np/Ns)$, respectively, where D is the duty cycle of switch S1 in percent on-time and NP and NS are the number of turns in the primary and each secondary winding, respectively. Obviously, when D is close to 50%, $V_B$ is close to the output voltage (Vo) during both S1 OFF and ON periods, and consequently, only a very small output filter inductor ($L_f$) is needed. Unfortunately, there are several reasons why the converter can not operate at close to 50% duty cycle at nominal input voltage in most applications. The Ninomiya HB converter shown in FIG. 2A has a voltage conversion-ratio characteristic as shown in FIG. 3. It can be seen that the converter has a maximum gain at 50% duty cycle. In order to accommodate certain load or line transient response requirements as well as component tolerances, the converter is typically operated at around 35% duty cycle even if the steady-state input voltage $V_{IN}$ is fixed. Considering that in most applications the input voltage has a certain variation range, the steady-state duty cycle is often less than 30%. With such a low duty cycle, $V_B$ will be much high than Vo during S1 ON period and much lower than Vo during S1 OFF period. As a result, the converter requires the use of a large $L_f$ to meet adequate efficiency and filtering requirement. This significantly increases the size and cost of the converter and also results in higher power losses.

Another drawback of the Ninomiya converter shown in FIG. 2A is that it has an inherent control stability problem at very light load or no load. As a result, the converter requires the use of either a pre-load resistor which is simple but very lossy or an active pre-load which is very complicated and expensive to implement.

This invention discloses an improved HB converter that overcomes the above-mentioned drawbacks of the prior art HB converters.

SUMMARY OF THE INVENTION

The present invention is illustrated in a variety of half-bridge, dc-to-dc converter circuits such as a zero-voltage switching, half-bridge, pulse width modulated dc-to-dc converter comprising a transformer having a primary winding and first and second secondary windings. The first secondary winding has a greater number of winding turns than the second secondary winding. First and second controllable switching devices are connected for alternately coupling one terminal of the primary winding to one of a pair of relatively positive and relatively negative dc input terminals. First and second rectifiers are coupled in series circuit with one terminal of a respective one of the first and second secondary windings and a first dc output terminal. Another terminal of each of the first and second secondary windings is connected to a second dc output terminal. In a converter implementing zero voltage switching, capacitance coupled with reactance of the primary winding is used to establish a resonant circuit to effect zero voltage switching of the first and second switching devices. The invention further discloses a pre-load circuit for use with the dc-to-dc converter in order to maintain minimum current for a broad range of output loading.

BRIEF DESCRIPTION OF THE DRAWINGS

For a better understanding of the present invention, reference may be made to the following detailed description taken in conjunction with the accompanying drawings in which.

DETAILED DESCRIPTION OF THE INVENTION

Figure 4:
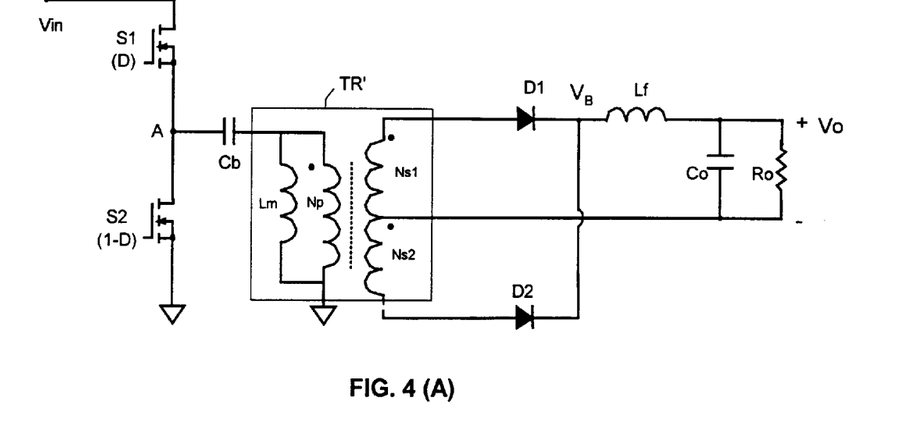
FIG. 4A is a simplified schematic representation of one form of half-bridge, zero voltage switching, pulse-width modulated, dc-dc converter incorporating at least some of the teachings of the present invention.
FIG. 4B illustrates various voltage and current waveforms occurring in the converter of FIG. 4A.

FIG. 4A is a simplified circuit diagram of one form of an HB-ZVS-PWM converter 20 incorporating at least some of the teachings of the present invention. The converter 20 includes two power switches S1 and S2, a dc-blocking capacitor Cb, a power transformer TR, two rectifying diodes D1 and D2, an output filter inductor $L_f$, and an output filter capacitor Co. The power transformer TR' differs from the transformer TR of FIG. 2A by having two secondary windings $N_{S1}$, $N_{S2}$ with different numbers of turns. FIG. 4B illustrates the switching waveforms for the converter 20. The converter 20 also uses the energy stored in the transformer TR' magnetizing inductance to achieve ZVS.

During S1 OFF period (t1–t2) and ON period (t3–t0'), the voltage $V_B$ at the diode side of inductor $L_f$ is given by:

$$V_B = \frac{DN_{S2}}{N_P} V_{in}, \text{ for } t1 < t < t2$$

and $$V_B = \frac{(1-D)N_{S1}}{N_P} V_{in} \text{ for } t3 < t < t0'$$

where D is the ON time of switch S1 in percent duty cycle, 1−D is the ON time of switch S2 in percent duty cycle, $N_P$ is the number of primary winding turns of transformer TR', $N_{S1}$ is the number of turns of winding $N_{S1}$ and $N_{S2}$ is the number of turns of winding $N_{S2}$. Assuming that the switching transition times t0–t1 and t2–t3 are much shorter than the switching period, e.g., t1–t2, the voltage conversion ratio of this converter is given approximately by:

$$V_O = \frac{D(1-D)(N_{S1} + N_{S2})}{N_P} V_{in}$$

where $V_O$ is the output voltage at load $R_O$ and $V_{IN}$ is the input voltage applied to the transformer primary winding when switch S1 is ON. Thus the peak to peak ripple of the $L_f$ current, $\Delta I_{Lf}$, can be calculated as:

$$\Delta I_{Lf} = \frac{D(1-D)(N_{S1} - D(N_{S1} + N_{S2}))}{f_s L_f N_P} V_{in}$$

where $f_S$ is the switching frequency of the switches S1, S2. It can be seen that for a given D, zero $L_f$ current ripple can be obtained if the following condition is satisfied:

$$\frac{N_{S1}}{N_{S2}} = \frac{D}{1-D}$$

Figure 5:
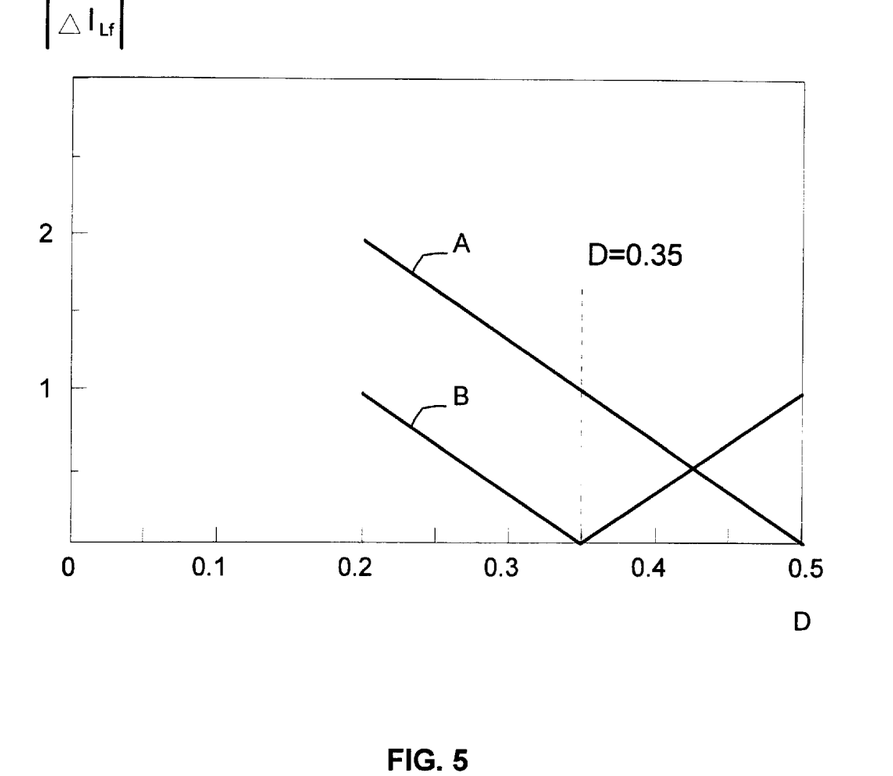
FIG. 5 is a graph comparing the value of ripple current in a converter output as a function of switching duty cycle for the converter of FIG. 2A and FIG. 4A.

As a result, an output filter inductor having a very small inductance value $L_f$ can be used. In a practical circuit, the input voltage will have a characteristic range, and the value of D will have to be modulated with variations in the input voltage to maintain the output voltage. By selecting $N_{S1}$ and $N_{S2}$ to meet the above zero current ripple requirement at nominal input voltage or nominal duty cycle, the size of inductor $L_f$ is minimized and the efficiency of the converter is also optimized. As the duty cycle offsets from the nominal value due to either input voltage variation or load current transient, the inductor $L_f$ current ripple will increase and the converter efficiency tends to decrease. However, the efficiency under such operating conditions is usually much less critical. In addition, to meet the same $L_f$ current ripple and worst-case efficiency requirements over the entire input voltage range, the converter 20 shown in FIG. 4A requires a much smaller inductor $L_f$ than the prior art HB converters. As an example, the converter of FIG. 4A may receive an input voltage varying from 320 to 380 volts and produce an output voltage of 18 volts with a maximum output power of about 65 watts. For that circuit, the switching devices S1 and S2 may be type IRF830 MOSFET devices, the dc blocking capacitor Cb is typically 0.1 $\mu$fd at 250 volts rated voltage, the transformer primary winding may have 56 turns while the two secondary windings NS1 and NS2 may have five turns and nine turns. The line filter Lf is selected to be 40 $\mu$H and the output capacitor Co is 390 $\mu$fd. FIG. 5 compares the typical $L_f$ current ripple between the converters 10 and 20, where line A represents converter 10 and line B represents converter 20. It is assumed that in both converters the duty cycle needs to vary from 20% to 50% in order to accommodate certain input voltage and load current variations, and the nominal steady-state duty cycle is 35% (0.35). All the circuit components and operating conditions of the converters 10 and 20 are the same except that the number of turns of the two secondary windings $N_{S1}$, $N_{S2}$ of converter 20 are different. In order to achieve zero output current ripple at nominal operating condition (D=35%), the ratio of $N_{S1}$ and $N_{S2}$ is selected at $N_{S1}:N_{S2}$=0.54 in FIG. 4A. In order to facilitate fair comparison the total number of two secondary winding turns ($N_{S1}+N_{S2}$) is the same as in FIG. 2A so that both converters have identical voltage conversion-ratio characteristics. From FIG. 5 it can be seen that over the entire operating D range, the maximum $\Delta I_{Lf}$ of the converter 20 of FIG. 4A is only half of converter 10 of FIG. 2A. Moreover, at nominal duty cycle, i.e., 35%, the converter 20 has zero $\Delta I_{Lf}$, meaning the circuit has minimized AC conduction losses (which are associated with the amplitude of $\Delta I_{Lf}$) and core loss in the output filter inductor $L_f$. Therefore, the converter 20 of FIG. 4A provides size, efficiency, and cost advantages over the converter 10 of FIG. 2A.

Another aspect of this invention is associated with the light load operation of a ZVS HB converter using asymmetrical duty cycle control. The ZVS HB converter of the type shown in FIGS. 2A and 4A exhibit an inherent control stability problem which causes converter oscillations at very light load. This usually happens when the load current becomes so low that the $L_f$ current enters a discontinuous conduction mode (DCM) and the duty cycle D of the switching devices becomes very low. To solve this problem, a pre-load is required at very light load or no load in order to maintain a minimum continuous current. In order to avoid increasing the converter power losses at heavy load, this pre-load should only be activated under light load conditions. A conventional way of implementing such a pre-load (often referred to as an active pre-load) requires secondary-side load current sensing by using either a current transformer or a current-sensing power resistor (which is less expensive but very lossy since it is used in the main power path). The sensed current signal is then compared with a reference signal in a comparator to control a switch to either turn on (at light load) or turn off (at heavy load) the pre-load. Such a way of implementing the active pre-load is expensive, complicated, and sometimes very lossy (especially for high output current applications).

Figure 6:
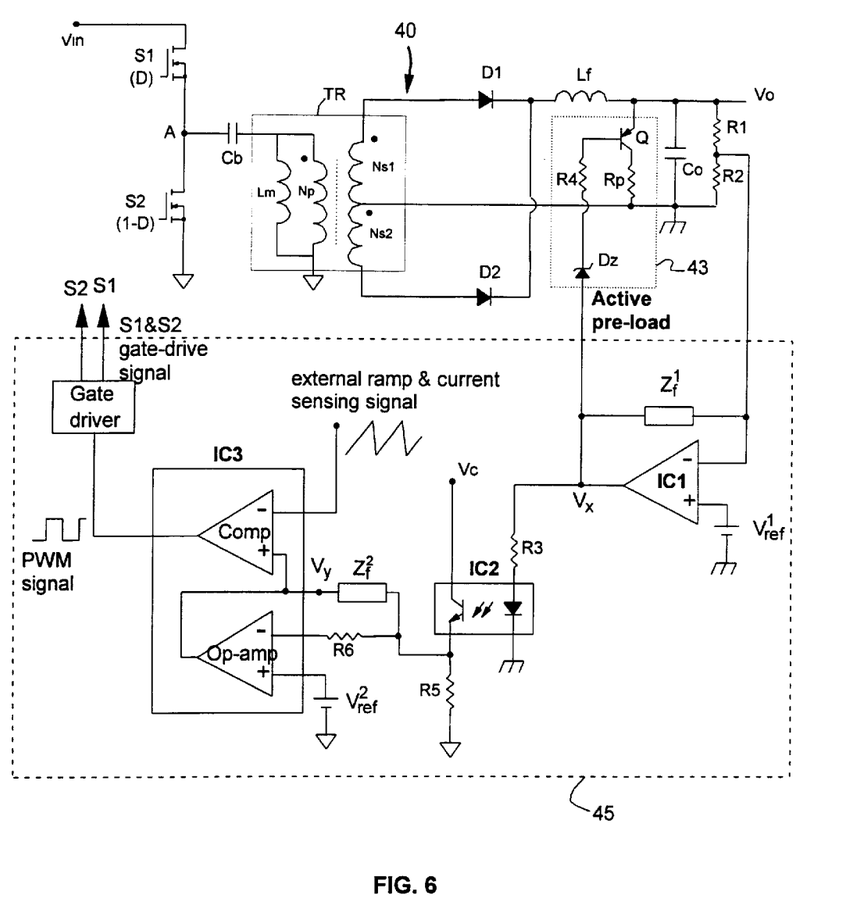
FIG. 6 is a simplified schematic representation of a zero voltage switching, pulse width modulated dc-dc converter incorporating an active pre-load circuit in accordance with at least some of the teachings of the present invention.

The present invention discloses a simple, reliable, and economical approach for implementing an active pre-load. Referring to FIG. 6, there is shown one embodiment of an active pre-load circuit 43 in accordance with the teaching of the present invention as applied to a converter 40 of the type shown in FIG. 4A. The inventive circuit uses only four components—a transistor Q, a pre-load resistor $R_P$, a gate resistor R4, and a zener diode Dz—to form an active pre-load. The transistor Q is used as a switch to selectively couple the pre-load resistor $R_P$ across the converter output terminals. The zener diode $D_Z$ and gate resistor R4 are selected to gate transistor Q into conduction when the converter output voltage drops below a selected threshold. R1 and R2 form a resistive voltage divider to sense the converter output voltage and provide a signal representative of the converter output voltage. Operation of the converter 40 is established by a control circuit 45 which includes three integrated circuits IC1, IC2 and IC3, a gate driver circuit 48 and several passive components. The circuit IC1 is a secondary-side operational amplifier (Op-Amp) which compares the output voltage representative signal against a reference voltage $V_{REF1}$. For purpose of discussion, secondary-side refers to that portion of the converter 40 connected to the transformer TR secondary windings NS1 and NS2, while primary-side refers to that portion of the converter connected to the transformer primary winding $N_P$. The output signal of Op-Amp IC1 $V_X$, is transferred to the transformer primary side through an opto-coupler IC2. The op-amp IC1 is a conventional operational amplifier having a feedback element $Z_{f1}$ coupled between an inverting input terminal and an output terminal. As shown, the voltage representative signal is applied to the op-amp inverting input terminal and the reference voltage signal $N_{ref1}$ is applied to a non-inverting input terminal. The reference voltage $V_{ref1}$ is preferably developed by a separate electronic circuit (not shown) in a well known manner. The output signal $V_X$ is developed at the op-amp IC1 output terminal. The signal $V_X$ is coupled through series resistor R3 to an input terminal of opto-coupler IC2. Coupler IC2 develops an output signal at terminal 42 across the resistor R5 and this output signal is coupled to an inverting input terminal of a second op-amp 44 through a resistor R6. Op-amp 44 is part of an integrated pulse width modulation (PWM) signal generator IC3 which includes a comparator 46. The non-inverting input terminal of op-amp 44 is coupled to another voltage reference source $V_{ref2}$. A feedback element $Z_{f2}$ couples the op-amp 44 inverting input to the op-amp output. The op-amp 44 output voltage $V_{y1}$ is coupled to a non-inverting input terminal of comparator 46 while a sawtooth ramp signal is coupled to the inverting input terminal of comparator 46. The comparator 46 generates a conventional PWM signal whose characteristic is determined by the magnitude of the converter output voltage, i.e., the PWM signal is such as to gate the switches S1, S2 in a manner to regulate the converter output voltage to a desired value. A conventional gate driver circuit 48 converts the PWM signal into appropriate gate drive signals for application to the electronic switches S1, S2.

Figure 7:
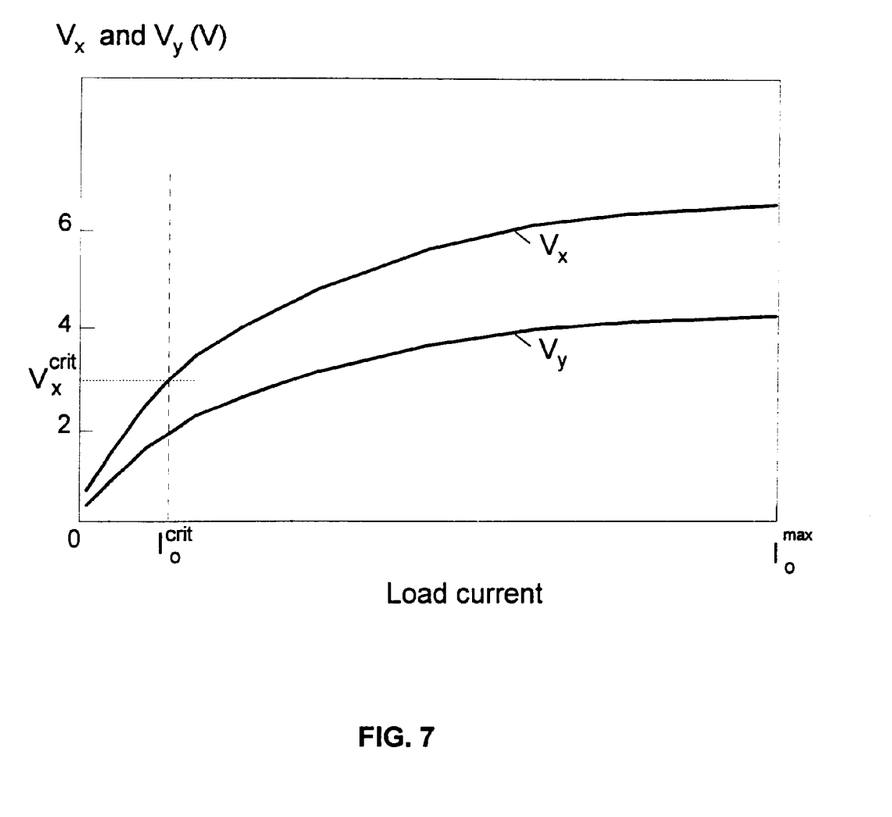
FIG. 7 is a graph comparing pre-load control voltage to converter feedback control voltage as a function of converter output current.

When the converter operates in continuous conduction mode (CCM), the duty cycle decreases slowly as the load current decreases due to the component parasitics. As the converter enters DCM at light load, however, the duty cycle of the converter decreases quickly as the load current continues to drop. A typical $V_y$ which is usually proportional to D vs. a load current curve is shown in FIG. 7. With two Op-Amps in series, there is an infinite number of ways of designing the feed back compensation networks ($Z^1_f$ and $Z^2_f$) to meet a certain transfer function requirement. In this design, however, it is essential that $Z^1_f$ and $Z^2_f$ are selected in such a way that the secondary-side Op-Amp IC1 has an almost infinite DC gain but that the primary side op-amp 44 has a low DC gain. The high gain of op-amp IC1 assures that any small deviation of output voltage is transformed into an appropriate control signal so as to adjust the output voltage to the regulated value. As a result, the steady-state voltage $V_X$ of the secondary side Op-Amp IC1 is proportional to the voltage $V_y$, as shown in FIG. 7. Consequently, control switch Q for the pre-load resistance $R_P$ can be turned on and off automatically if the zener diode $D_Z$ has an adequate threshold voltage. Assume that to warrant circuit stability the pre-load needs to be enabled when the load current is below a certain value, $I_O^{crit}$, and the corresponding $V_X$ value at $I_O^{crit}$ is equal to $V_X^{crit}$. Then the threshold voltage of diode $D_Z$ should be selected approximately at:

$$V_{DZ}=V_O-V_X^{crit}-V_{eb}$$

where $V_{eb}$ is the emitter-to-base bias voltage of the transistor Q. At heavy load, $V_X$ is greater than $V_X^{crit}$, so the transistor Q is off and the pre-load is disabled. When the load current is below $I_O^{crit}$, transistor Q is turned on and the pre-load resistor $R_P$ is connected across the converter output terminals.

Figure 8:
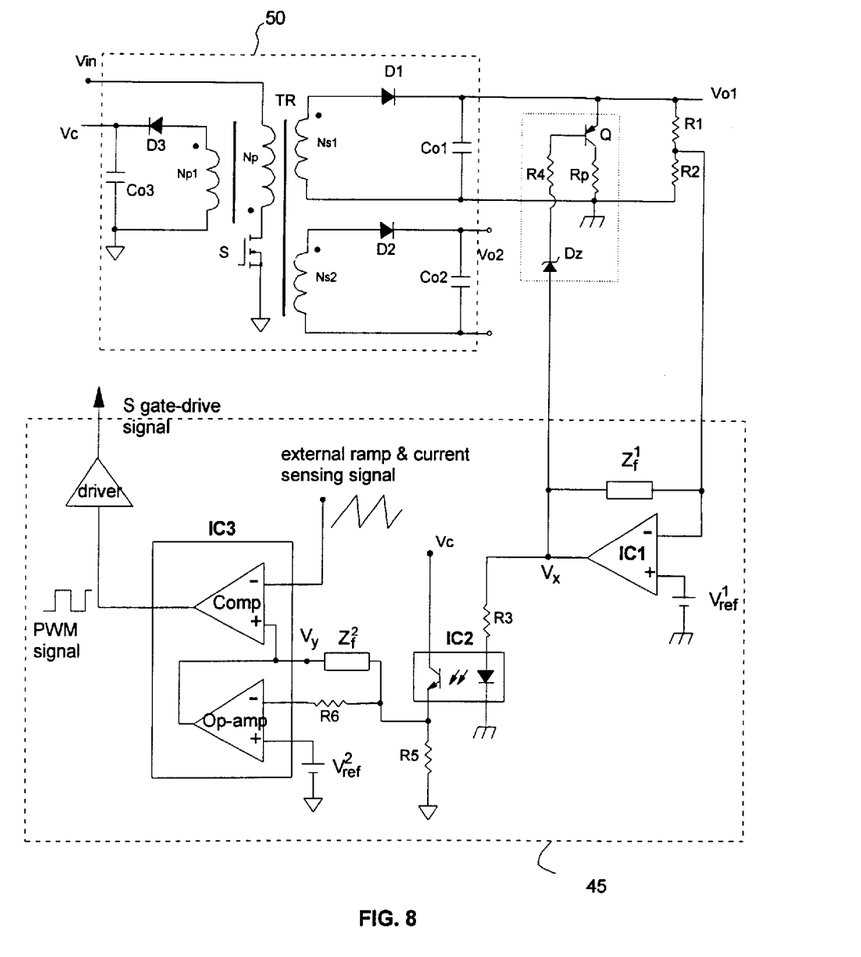
FIG. 8 illustrates an application of the active pre-load circuit of FIG. 6 applied to a multiple output flyback converter.

It is noted that the active pre-load circuit illustrated in FIG. 6 can be extended to other converter topologies such as, for example, buck, boost, or buck-boost types to solve several common problems that occur at light load or no load. As an example, FIG. 8 shows a typical circuit diagram for a multiple-output flyback converter 50. The control circuit 45 senses and tightly regulates the main output voltage, Vo1, from main winding NS1. When the output current from winding NS1 decreases, the duty cycle of the converter switch S also decreases. As a result, the output voltage Vo2 from auxiliary winding NS2 and the self-bias voltage Vc from the tertiary winding $N_{P1}$ also decrease. If the main winding NS1 load current continues to decrease, the converter 50 often experiences two common problems. First, the converter 50 will experience a cross-regulation problem, i.e., the voltage Vo2 will fall below its specified minimum value as the main winding NS1 load current becomes too low. Second, the converter 50 will run into a hic-up mode during which the converter output voltage loses control and swings up and down irregularly. The second problem occurs when the control bias voltage Vc becomes too low to adequately support the control IC's, i.e., IC1, IC2 and IC3 in the control circuit 45. These two problems are in many applications. To solve these problems without increasing the converter power loss at heavy load it requires the use of an active pre-load. The active pre-load circuit illustrated in FIG. 6 can be directly applied here, as shown in FIG. 8. The operation of the pre-load circuit 43 in FIG. 8 is essentially identical to its operation as described with reference to FIG. 6.

Figure 9A:
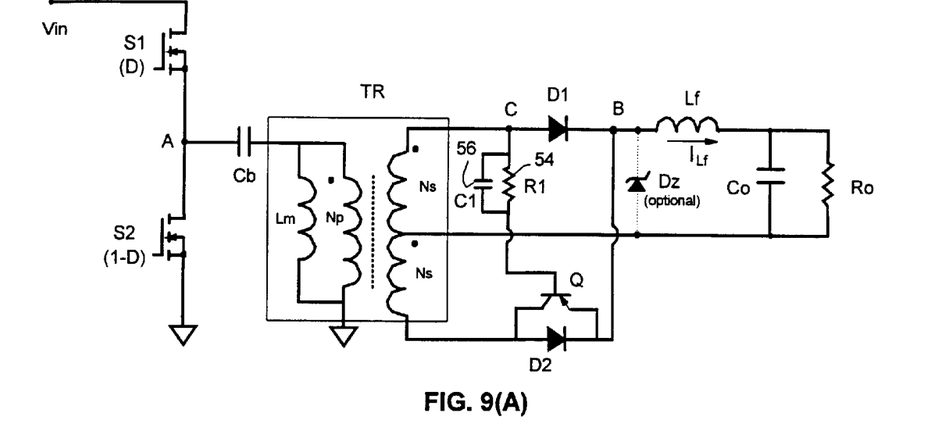
FIG. 9A illustrates another form of active pre-load circuit as applied to a converter of the type illustrated in FIGS. 2A and 4A.
Figure 9B:
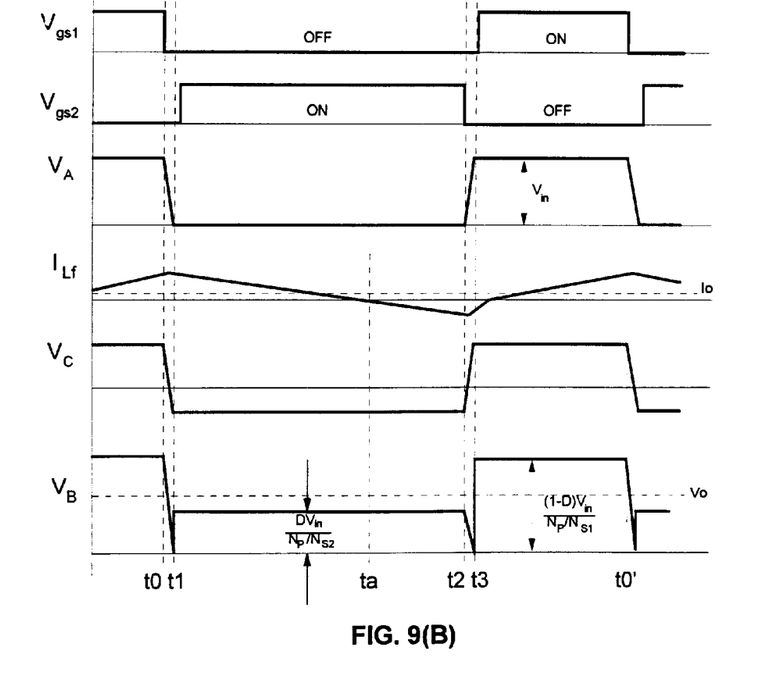
FIG. 9B illustrates voltage and current waveforms occurring in the converter circuit of FIG. 9A.

FIG. 9A shows another embodiment of an active pre-load circuit for solving the light load operation problem of the converter 40 (or converter 30) shown in FIG. 4A. In this embodiment, a PNP transistor Q2 is connected in parallel circuit with diode D2 and arranged to conduct current oppositely of current through diode D2. A gate resistor 54 and parallel connected accelerating capacitor 56 connect a gate terminal of transistor Q2 to terminal 18 of winding NS1 where the anode terminal of diode D1 is connected. At heavy load when the converter 40 operates in the continuous conduction mode (during which the $L_f$ current is always positive), the operation of the converter is the same as was discussed with reference to FIG. 4A. FIG. 9B shows the switching voltage and current waveforms at light load when the $L_f$ current $I_{Lf}$ would have entered DCM if transistor Q2, resistor 54 and capacitor 56 were not used. During switch S1 ON period (t3–t0'), the gate of transistor Q2 is reverse-biased and thus Q2 is off and the operation of the converter is still the same as in FIG. 4A. After switch S1 is turned OFF and switch S2 is turned on at time t1, the voltage $V_B$ at the cathodes of diodes D1 and D2 is below the output voltage at load Ro and the current $I^{Lf}$ starts to decay. During this time, transistor Q2 is turned on due to the positive bias current at its base. After the current $I_{Lf}$ reaches zero at time $t_a$, it becomes negative and continues to ramp down at the same rate until switch S2 is turned off at time t2. Then the negative $I_{Lf}$ current will decay to zero quickly by charging the junction capacitances of the rectifying diodes D1 and D2. It can be seen that the use of the transistor Q2 enables the current $I_{Lf}$ to go negative during switch S1 OFF period. As a result, the duty cycle of the converter is extended, and the converter becomes able to operate at very light or no load without any stability problem. The accelerating capacitor 56 is used to expedite the turn on and turn off of transistor Q2 and thereby reduce its switching losses. In addition, it is noted that to limit the voltage spike at "B" at transistor Q2 turn off, a small snubber such as zener diode $D_{Z2}$ could be used. The snubber can also be implemented with resistor-capacitor-diode clamp circuit at "B". Further, another way to avoid the transistor Q2 turn-off voltage spike at "B" is to add another transistor (not shown) across the rectifying diode D1. After transistor Q2 is turned off at time t3, the negative $IL_f$ current will continue to flow through the transistor across the diode D1.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A zero-voltage switching, half-bridge, pulse width modulated dc-to-dc converter comprising:

a transformer having a primary winding and first and second secondary windings, said first secondary winding having a greater number of winding turns than said second secondary winding;

first and second controllable switching means connected for alternately coupling one terminal of said primary winding to one of a pair of relatively positive and relatively negative dc input terminals;

first and second rectifying means coupled in series circuit with one terminal of a respective one of said first and second secondary windings and a first dc output terminal, another terminal of each of said first and second secondary windings being connected to a second dc output terminal; and reactive means associated with said primary winding for establishing a resonant circuit to effect zero voltage switching of said first and second switching means.

2. The converter of claim 1 wherein the ratio of the number of turns $N_1$ of said first secondary winding to the number of turns $N_2$ of said second secondary winding is determined from the relationship:

$$\frac{N_1}{N_2} = \frac{D}{1-D},$$

where D is a selected nominal duty cycle.

3. The converter of claim 2 wherein the selected nominal duty cycle is in a range of about 25 to 35 percent.

4. The converter of claim 1 and including an output filter coupled conjointly to each of said secondary windings and comprising the serial combination of an inductor and a capacitor with the dc output being developed across the capacitor.

5. The converter of claim 1 and including an active pre-load coupled to said dc output terminals.

6. The converter of claim 5 wherein said active pre-load comprises a controllable switch connected in series with a resistor across said dc output terminals and a voltage responsive device coupled for energizing said switch when current at said dc output terminal is less than a selected value.

7. The converter of claim 6 and including means for monitoring voltage at said dc output terminals and for providing a signal representative of the monitored voltage, said voltage responsive device being responsive to said voltage representative signal.

8. The converter of claim 7 wherein said voltage monitoring means comprises voltage sensing means coupled to said dc output terminals and amplifier means coupled to said voltage sensing means for developing said voltage representative signal.

9. The converter of claim 8 and including control means for providing signals to control the operation of said switching means, said control means being responsive to said voltage representative signal for adjusting the duty cycle of said switching means in a manner to regulate voltage at said dc output terminals to a selected value.

10. The converter of claim 9 wherein said controllable switch comprises a transistor in series circuit with another resistor, said another resistor loading said converter when said transistor is rendered conductive, and said voltage responsive device comprising a zener diode connected between a base terminal of said transistor and an output terminal of said amplifier means.

11. The converter of claim 9 wherein said amplifier means comprises a first operational amplifier having a relatively high gain for responding to minute variations in said dc output voltage.

12. In a half-bridge, pulse width modulated dc-to-dc converter of the type having a pair of serially connected switching devices coupled in parallel with a dc source, a transformer having a primary winding and first and second secondary windings with the primary winding being coupled in parallel with a first one of the pair of switching devices, one terminal of each of the secondary windings being connected to a common dc output terminal and another terminal of each of the secondary windings being connected through a corresponding one of a pair of diodes to a first terminal of an output filter inductor, a second terminal of the filter inductor being connected to another dc output terminal of the converter, a method for reducing a size of the filter inductor without increasing ripple current comprising the step of providing a greater number of turns on the first secondary winding than on the second secondary winding.

13. The method of claim 12 wherein the step of providing includes the step of computing a ratio of the number of turns in the first secondary winding to the number of turns in the second secondary winding as being proportional to the ratio of $D/(1-D)$, where D is the percent on-time of the second one of the pair of switch devices computed at a selected duty cycle operating point of the converter.

14. The method of claim 13 and including the further step of coupling an active pre-load to the dc output terminals of the converter.

15. A dc-to-dc converter comprising:

a controllable electronic power switching circuit coupled to a dc power source;

a transformer having a primary winding and at least one secondary winding, said primary winding being coupled through said power switching circuit to said dc power source;

rectifier means coupling said at least one secondary winding to a pair of dc output terminals of said converter;

voltage sensing means coupled to said dc output terminals for providing a signal representative of the magnitude of dc voltage at the output terminals;

control means coupled for receiving said signal and responsive thereto for generating gating signals to control the conduction duty cycle of said power switching circuit in a manner to regulate the dc output voltage to a desired magnitude, said control means including at least one operational amplifier having a relatively high dc gain connected for comparing said dc voltage representative signal to a reference voltage; and an active pre-load circuit coupled to said dc output terminals for maintaining converter output current at at least a minimum selected value, said pre-load circuit being coupled to and responsive to a selected low voltage output of said at least one operational amplifier for coupling a resistive load to said dc output terminals for maintaining minimum current through said converter said pre-load circuit comprising an electronic switching device connected in series circuit with a resistor across said dc output terminals and a zener diode serially coupled between a gating terminal of said electronic switching device and an output terminal of said at least one operational amplifier.

16. The converter of claim 15 wherein said power switching circuit comprises a pair of serially connected switching devices coupled in parallel circuit with the dc power source, said transformer primary winding being coupled in parallel circuit with one of said serially connected switching devices.

17. The converter of claim 15 and including a second secondary winding on said transformer, one terminal of said second secondary winding being connected to a corresponding terminal of said at least one secondary winding and another terminal of said second secondary winding being coupled through another rectifying means to a respective one of said dc output terminals, and further including a line filter inductor coupled in series circuit between each of said rectifying means and said dc output terminals, wherein said second secondary winding has a fewer number of turns than said at least one secondary winding for reducing ripple current when the converter is operated at less than fifty percent duty cycle.

* * * * *